Dec. 12, 1944. J. A. OSELLA 2,364,911
REPAIRING RUBBER HOSE
Filed Sept. 19, 1942
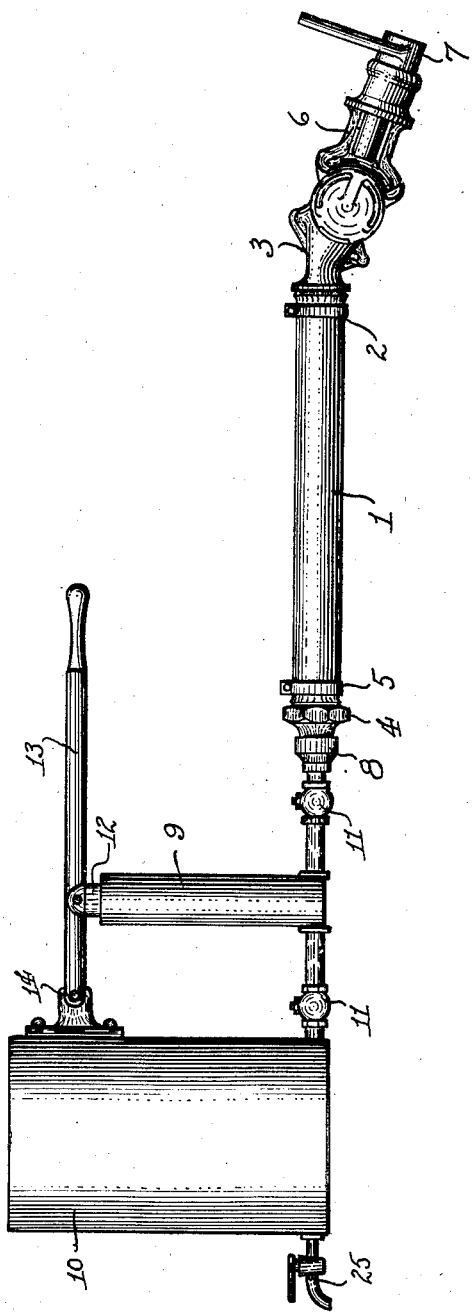
INVENTOR.
Joseph Albert Osella
BY Booth & Booth
ATTORNEYS.

Patented Dec. 12, 1944

2,364,911

UNITED STATES PATENT OFFICE 2,364,911

REPAIRING RUBBER HOSE

Joseph Albert Osella, Roseville, Calif.

Application September 19, 1942, Serial No. 459,050

1 Claim. (Cl. 91—18)

The present invention relates to repairing and preserving the useful life of rubber or rubber lined hose, particularly the short lengths of hose used for coupling the air and steam train lines of railway cars.

The object of the invention is to provide simple and easily operated means for stopping small leaks in hoses, thereby prolonging the useful life thereof. At the present time, the conservation of rubber and articles of manufacture containing rubber is of great importance. The air and steam hoses of railway cars, made of woven fabric impregnated and coated both inside and outside with rubber, are subject to rapid deterioration, due to repeated flexing and continuous exposure to air and dust, and soon develop small leaks. Under normal conditions, such hoses, particularly air hoses, are discarded as soon as they develop leaks, because the leaks, by permitting escape of air pressure, impair the efficiency and effective operation of the train braking system. By the use of the present invention, however, such a leaky hose can be quickly and easily repaired and restored to usable condition, provided the fabric carcass has not been ruptured, thereby prolonging its useful life for a considerable time, and reducing materially the frequency of replacement.

Reference will be made to the accompanying drawing, which illustrates a preferred form of apparatus for carrying out the invention, with the understanding that the invention is applicable to other types of flexible hose, and that changes, within the scope of the appended claims, may be made in the construction and operation of the various parts herein shown and described, without departing from the spirit of the invention.

The single figure of the drawing is an elevation of the preferred apparatus, with a standard railway car air hose in position for repair.

The reference numeral 1 designates the hose to be repaired, which is about two feet long and has an inside diameter of one and three-eighths inches. At one end the hose has attached to it, by a clamp 2, the usual standard coupling 3 by which it is separably connected, when in service, to the hose of the next car of the train. At the other end of the hose is the standard bushing 4 to which the hose is secured by a clamp 5. The bushing has threads at its outer end for connection, in service, with the train line pipe of the car (not shown).

When the hose develops leaks and is to be repaired, it is removed from the car, with its end fittings 3 and 4 still secured to it by the clamps 2 and 5, by unscrewing the bushing 4 from the train pipe. A dummy coupling 6 is then fitted to the coupling 3, said dummy coupling being of standard form as used in railroad service, comprising a standard coupling member having a plug 7 in its free end. By fitting the dummy coupling 6 to the hose coupling 3, it forms a tight seal or plug member for the outer end of the hose.

The bushing 4 is screwed into a fitting 8 at the discharge side of a pump 9, and the inlet side of said pump is connected with a reservoir 10 containing liquid rubber cement. Check valves, indicated at 11, control the inlet and discharge of the pump 9. The plunger 12 of said pump is operated manually by a lever 13, which is shown for convenience as having its fulcrum 14 attached to the side of the reservoir 10. A faucet 15 may be provided in the reservoir, for filling the hose before it is connected with the discharge of the pump.

In repairing a leaky hose, after the hose has been removed from service, and after the dummy coupling 6 has been fitted to its coupling 3, it is filled or partially filled through its other end with rubber cement, preferably from the faucet 15. The bushing 4 is then screwed into the pump discharge fitting 8, whereupon the parts are in the position shown in the drawing. The pump is then operated to force more liquid rubber cement from the reservoir into the hose, thereby completely filling it and raising its interior pressure sufficiently to force the cement into any leaks and cracks in the walls of the hose. When the cement is observed to ooze out from the outer surface of the hose, the dummy coupling 6 is removed and the liquid rubber cement is allowed to drain out from the interior of the hose into a suitable receptacle, not shown, from which it may be returned to the reservoir for re-use. The bushing 4 is then removed from the fitting 8, and the hose is laid away to dry and to allow the cement which has remained in its cracks and adhering to its surfaces to set. The cracks and leaks are completely filled, and as soon as the cement therein sets, the hose is ready for service.

It is necessary, of course, to use a suitable sealing fluid, but I have found that ordinary rubber cement, consisting of pure unvulcanized rubber dissolved in a liquid solvent is satisfactory. It has sufficient cohesive and adhesive qualities permanently to seal small cracks and leaks, and is sufficiently resilient to avoid loosening from repeated flexing of the hose. The thin layer of cement that adheres to the lining of the hose acts to seal future cracks that may develop in said lining, being forced into said cracks by the working air pressure in the hose.

I claim:

Apparatus for repairing leaks in a railway car hose, said hose having a coupling member secured to one end and a connecting bushing secured to the other end, comprising a plug member separably connected with said coupling member to form a seal therefor, a reservoir for containing sealing fluid, said reservoir having an outlet near its bottom, a pump barrel having an intake connected with said reservoir outlet, said barrel having a discharge fitting separably connected with said bushing, a plunger in said barrel, a lever connected with said plunger for operating the same to force said sealing liquid into the hose under sufficient pressure to fill the leaks therein, and a fulcrum bracket for said lever mounted upon a wall of said reservoir.

JOSEPH ALBERT OSELLA.